March 2, 1937.  A. PERRELET  2,072,566
COMBINED STRETCHING AND SEALING TOOL
Filed March 13, 1934  9 Sheets-Sheet 1

INVENTOR:
Armand Perrelet

ATTORNEY

March 2, 1937.  A. PERRELET  2,072,566
COMBINED STRETCHING AND SEALING TOOL
Filed March 13, 1934  9 Sheets-Sheet 2

INVENTOR:
Armand Perrelet
By [signature]
ATTORNEY

March 2, 1937.  A. PERRELET  2,072,566
COMBINED STRETCHING AND SEALING TOOL
Filed March 13, 1934   9 Sheets-Sheet 4

INVENTOR:
Armand Perrelet
BY
ATTORNEY

March 2, 1937.  A. PERRELET  2,072,566
COMBINED STRETCHING AND SEALING TOOL
Filed March 13, 1934  9 Sheets-Sheet 5

INVENTOR:
Armand Perrelet
BY
ATTORNEY

FIG.18

March 2, 1937.  A. PERRELET  2,072,566
COMBINED STRETCHING AND SEALING TOOL
Filed March 13, 1934  9 Sheets-Sheet 7

INVENTOR:
Armand Perrelet
BY
ATTORNEY

March 2, 1937. A. PERRELET 2,072,566
COMBINED STRETCHING AND SEALING TOOL
Filed March 13, 1934 9 Sheets-Sheet 9

INVENTOR:
Armand Perrelet
BY
ATTORNEY

Patented Mar. 2, 1937

2,072,566

UNITED STATES PATENT OFFICE 2,072,566

COMBINED STRETCHING AND SEALING TOOL

Armand Perrelet, Paris, France, assignor to Signode Steel Strapping Company, Chicago, Ill., a corporation of Illinois Application March 13, 1934, Serial No. 715,380
In France March 14, 1933

12 Claims. (Cl. 81—9.1)

The present invention has for its subject a portable apparatus for hooping by means of hoop iron all kinds of parcels, cases, bales and so forth, constructed in such a manner as to permit successively of stretching the hoop iron, closing the securing cap or seals, and to cut the hoop iron at the end of the operation.

In order to construct a portable apparatus which is as compact as possible, in a form of construction of the invention, there are combined on the same base:

(a) The device for feeding the hoop iron, this latter being provided with a milled wheel as also with members enabling the said wheel to be placed in contact with the hoop iron, or vice versa, to remove it from this contact; a movable lever capable of to and fro movement to actuate the milled wheel for a predetermined direction of its stroke, and thus to determine the tension of the hoop iron.

(b) The securing device for the cap or seal; this device is mounted at the rear of the milled wheel, the base being provided with an opening in which is located, for a certain position of the lever, the system of jaws for the securing cap or seal, these jaws being actuated, by means of a cam, through a secondary lever, independent of the main lever for feeding the hoop iron.

(c) The device for cutting the hoop iron which itself is actuated by the above mentioned secondary lever at the end of the stroke of the latter.

In a modification of the above apparatus, the above mentioned secondary lever is omitted and the single main lever serves both for the operations of tensioning the hoop iron, sealing the cap or seal, and cutting the hoop iron.

Moreover, in this modification the sealing device is provided with interchangeable members enabling hoop iron of different widths to be used.

This apparatus is characterized by a special device for sectioning the hoop iron as also by devices enabling the caps or seals to be formed and for centering the hoop iron in an efficient manner.

Finally, the said apparatus is characterized by an unlocking device, permitting of automatic release of the tensioning wheel when desired after tensioning the hoop iron, effecting the sealing and the sectioning.

In another modification of the invention:

(a) There is used a cam with multiple bosses enabling the jaws to be opened automatically after each sealing.

(b) The free ends of the arms of the jaws are provided with rollers so as to obviate wear of the cams.

(c) There is used in combination with the sealing jaws a blade adapted to promote the actioning of the hoop iron with a view to permitting its easy detachment by hand by a simple folding movement.

These arrangements as also other secondary features of the invention will be described hereinafter in greater detail with reference to the accompanying drawings, wherein:

Fig. 13' is a fragmentary sectional detail of a modification of the device shown in Fig. 13.

There will first be described Figs. 1 to 10.

To the base 1 of the apparatus is hinged at 2 the main lever 3 of the apparatus terminated by an operating handle 4. The lever 3 comprises projecting arms which are pivotally mounted on the shaft 2 in the manner shown in Fig. 14 in connection with another embodiment of the invention. This handle is suitably curved, as shown in the drawing and it rests on the top of the base when the lever is lowered thus imparting greater stability to the apparatus. The lever 3 to which is hinged at 5 a pawl 6, may for the direction of rotation indicated by the arrow f (Fig. 1) engage with a ratchet wheel 7 (Figs. 1, 4 and 5) secured to a milled wheel 8 for feeding the hoop iron and concentric with the latter.

Figure 1:
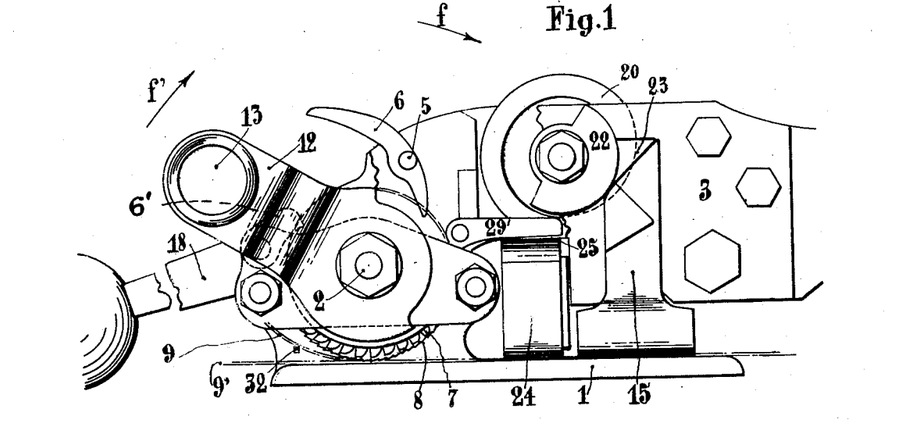
Fig. 1 is a view in side elevation of the apparatus with a part broken away.

When the apparatus is placed in position, the two ends 9 and 9' (Fig. 1) of the iron band to be stretched, occupy the position shown in Fig. 1, a small guide 32 is provided on the body of the apparatus; the band passes over this guide when entering the apparatus before being engaged in the opening, which permits the lower end to be separated and to facilitate the placing in position of the latter. The milled wheel 8 is only brought into contact with the iron band at the moment of applying tension and for placing the iron band in position it is necessary for the periphery of this milled wheel to be spaced a sufficient distance from the iron band. For this purpose the milled wheel 8 (with the ratchet wheel 7 secured thereto) is mounted loosely (Fig. 5) on an eccentric portion provided on the shaft 2, a flat portion 11 (Fig. 5) of the said shaft receiving a crank 12 (Figs. 1, 2 and 3) terminating in an operating handle 13. When turning the crank 12 in the direction of the arrow f' (Fig. 4) and by reason of the rotation of the milled wheel on the eccentric portion 10, the said milled wheel is caused to wedge the iron band between itself and the base 1. Under these conditions when the lever 3 is moved alternately in the direction of the arrow and in the opposite direction, then at each movement in the direction of the arrow f the iron band is fed and the operation is continued until the tension imparted to the iron band is judged to be sufficient. For bringing the lever 3 into the lowest position, that is to say in contact with the base 1 it is sufficient to disengage it from the teeth of the ratchet wheel 8 by acting, for this purpose, on the pawl 6.

The sealing device for the cap or seal, adapted to assemble together the two ends of the iron band, is mounted between the two limbs of lever 3 in such a position that when the said lever 3 is lowered, this device comes opposite an opening 14 (Fig. 2) provided in the base 1.

Figures 8, 9:
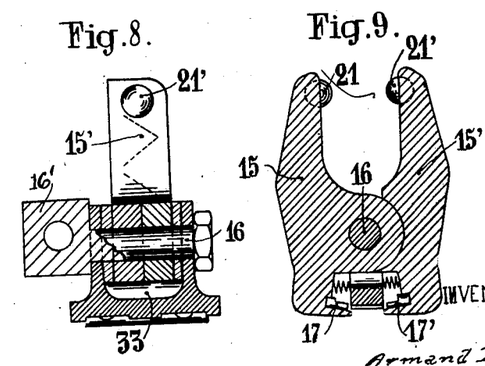

The device in question is essentially constituted by two jaws 15, 15', of which details are shown in Figs. 8 and 9. The short lower branches of these jaws have at 17—17' a suitable configuration so as to wedge the seal on the ends of the iron band located at the centre between the two jaws. These jaws are pivotally mounted by a pivot 16 on the lever 3. The pivot 16 extends in the longitudinal direction of the lever 3 and is carried by a block 16' carried on the underside of the lever 3 (Fig. 8).

Figure 2:
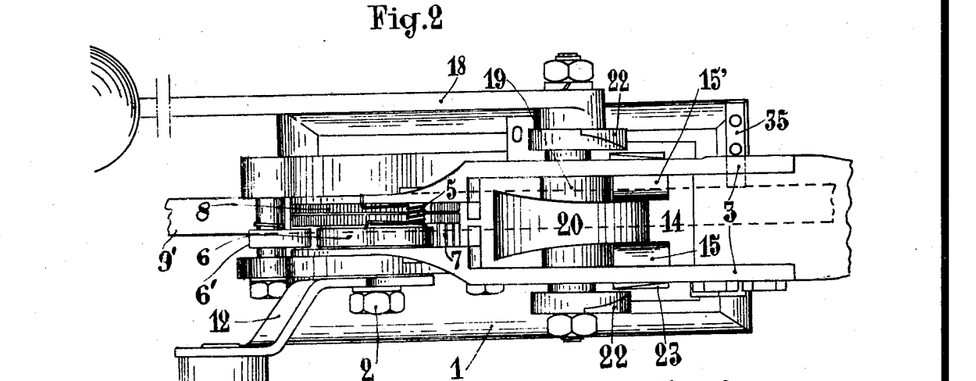
Fig. 2 is a corresponding plan view.
Figure 3:
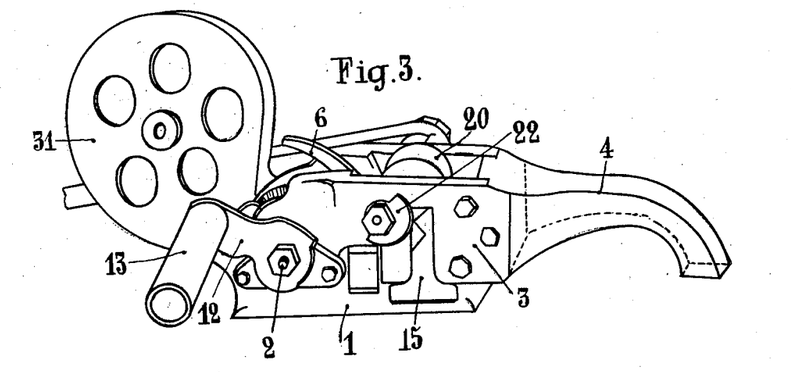
Fig. 3 is a perspective view of the complete apparatus, which while showing all the characteristic devices illustrated in Figs. 1 and 2 shows a modification of a form of construction of one of the members of the apparatus.
Figure 4:
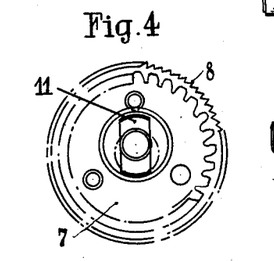
Figs. 4 to 10 are detail views of different members.
Figure 5:
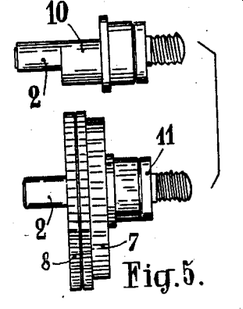
Figure 6:
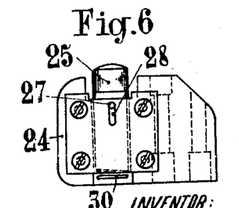
Figure 7:
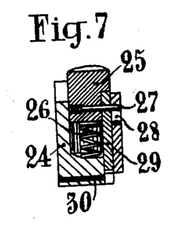

For operating the said jaws there is used a secondary lever 18 of which the axis is formed by a shaft 19 on which is keyed a cam 20 of suitable shape. The said cam acts on the upper branches of the jaws 15—15' against which it bears, preferably through the medium of balls 21, 21' (Figs. 8 and 9). When moving the lever 18 from left to right (as seen in Figs. 1, 2 and 3) the cam 20 determines the spacing of the upper branches of the jaws 15—15' and consequently the approach of the lower branches which effect the wedging of the sealing seal, previously placed in position, against the iron band.

The shaft 19 is also provided with other cams 22, which are arranged to engage inclined surfaces 23 on the upper ends of jaws 15, 15' when the lever 18 is moved back to its initial position, to effect positive disengagement of the jaws 15 and 15'.

The cutting device for the iron band (shown in detail in Figs. 6 and 7) is formed by a block 24 in which slides a piston 25 provided with a return spring 26 and of which the vertical movement is limited by a pin 27 engaging in a slide 28 provided on the block 24. The cutter blade 29 is secured to the piston 25. For exposing the passage for the band this block is movable vertically on two posts mounted on the base and extending through bores in the block 24, shown in dotted lines in Fig. 6.

Figures 13, 14, 15:
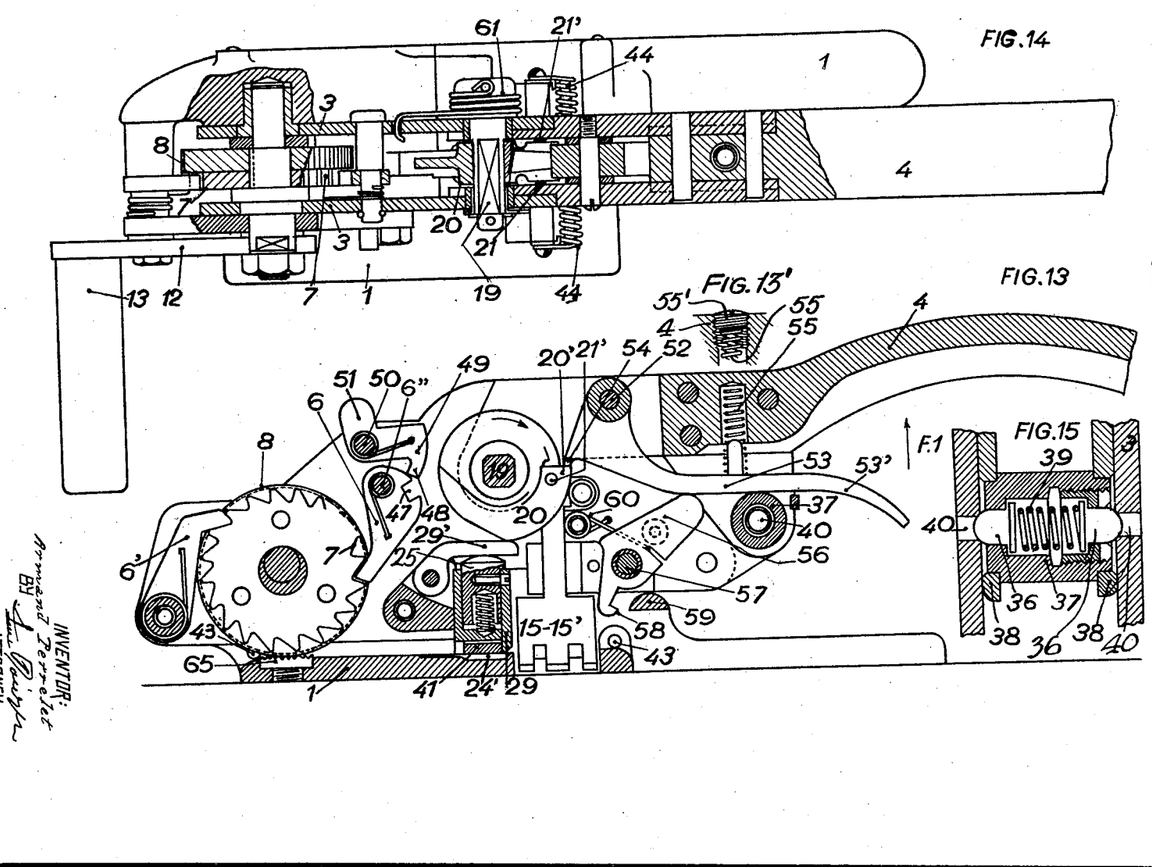
Fig. 13 is a section on the line 13—13 of Fig. 12.
Fig. 14 is a view corresponding with Fig. 12, but partly in horizontal section.
Fig. 15 is a detail view of the automatic locking mechanism of the movable handle.
Figure 16:
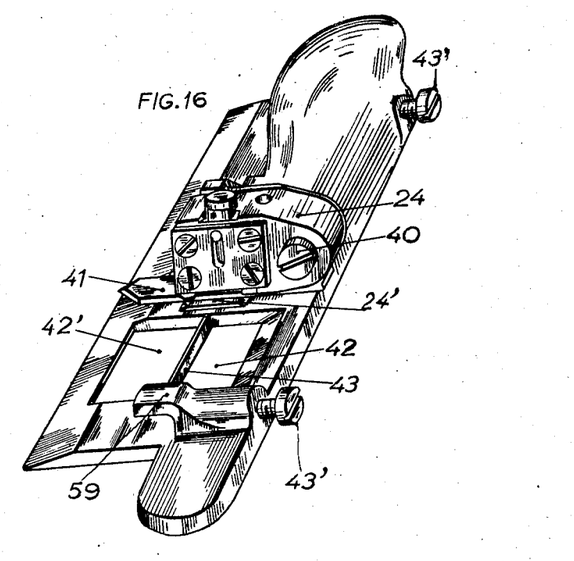
Fig. 16 is a detail view, in perspective, showing the sectioning device of the hoop iron and the base provided with an opening bridged by a rib for the formation of caps or seals from a metal plate. In this figure is also shown the device for centering the iron band, irrespective of its width.

The stroke of the piston is limited by engagement of lever 29 with the top of the block 24 so that the knife cuts only the upper iron band. The action on the head of piston 25 is effected by means of a small pushing lever 29' (Fig. 1) actuated by the same cam 20 which effects the closing of the jaws 15, 15', as shown in Fig. 13. The base 1 is provided underneath the piston 25 with a recess 33 enabling a clean cut to be made, the cutter being thus capable of descending lower than the level of the base.

Figure 10:
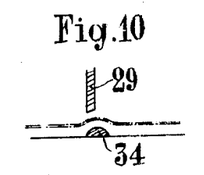

The same result may be obtained as shown in Fig. 10 by means of a finger 34 which causes the iron band to curve perpendicularly to the cutter 29.

The block 24 is provided with an opening 30, which serves as a guide for the band, the said opening effecting a spacing of the two portions of the band in such a manner as to facilitate the cutting of only the upper run by the knife 29. This guide leaves the free end of the band in the block 24, for following binding operations. A guide 35, for the band is provided on the base of the apparatus.

It will be understood that the arrangements above described have only been given by way of example and that any modifications may be made which fall within the scope of the invention. In particular the jaws are constructed in a manner to permit of the use of simple plates, instead of preformed seals, the jaws themselves forming the plates into seals as they close upon the bands. The same machine, as will readily be understood, enables preformed seals to be used.

In the form of construction shown in Fig. 3 the apparatus is completed by the addition of a casing 31 which forms a magazine for the iron band.

I may also provide the machine with a magazine for supplying seals either preformed or in the form of plates or in the form of a continuous band from which pieces are cut to make seals.

The operation of the device illustrated in Figs. 1 to 10 is as follows: The metal band 9' is passed in the form of a loose loop around a package and one end extends from the left, as shown in Fig. 1, over the base 1 to a point to the right of the sealing jaws 15—15'. The body of the strap lies over this end and passes to the left, as viewed in Fig. 1, over the guide 32. The superimposed runs of band being located in proper position with respect to the sealing jaws 15—15' and the milled wheel 8, the handle 13 is actuated so as to lower the milled wheel into contact with the upper run of the band. The lever 3, 4 is now oscillated back and forward, with the result that the pawl 6 rotates the milled wheel 8 in clockwise direction, as viewed in Fig. 1. A pawl 6' on the left hand side of Figs. 1 and 2 engages the ratchet 7 so as to prevent reverse rotation of the milled wheel 8. This operation is continued until the proper tension has been applied to the band, whereupon a seal or a plate from which a seal may be formed is applied upon the superimposed bands in sealing position or between the jaws 15—15'. The lever 3, 4 is then moved so as to bring it into the position shown in Fig. 1, that is, with the sealing jaws in sealing relation with respect to the seal and superimposed bands. The lever 18 is then moved in the direction of the arrows f—f', shown in Fig. 1, with the result that the cam 20 is rotated so as to spread the upper ends of the jaws 15, 15', thus forcing their lower ends towards each other, and causing them to make a seal which rigidly connects the two runs of strap or band together. The same movement of the lever 18 causes the actuation of the lever 29 by the cam 20, with the result that the upper run of the band is severed between the seal and the main stock. The lever 18 is now returned to its initial position, thereby spreading the jaws 15 and enabling the lever 3, 4 to be moved upwardly somewhat, whereupon the foot or base 1 may be slid out from beneath the band, leaving the package in satisfactorily sealed condition.

The device in Figs. 11 to 23 is provided with a handle 4 which, instead of being integral with the main lever 3, as in the case previously described, is pivotally mounted thereon, being pivotally carried by the shaft 19 of the cam 20. This handle 4 may be locked to the lever 3 by means of an automatic locking device consisting for example, as indicated in detail in Fig. 15, of two nipples 36 capable of sliding in a sleeve 37, mounted between two small plates 38, directed downwardly, secured to the handle 4. These nipples 36 are combined with a spring 39 tending to spread them apart and engage them in openings 40 provided for this purpose in the plates 3.

The tensioning of the band is effected, as in the preceding apparatus, by a milled wheel 8 actuated by a ratchet wheel 7 driven by means of a pawl 6 actuated by the lever 4—3 and co-operating with a retaining pawl 6', pivotally mounted at 6".

An important feature of the apparatus consists in the particular construction of the device for cutting the band. The device indicated in a general manner at 24 is pivotally mounted on a shaft 40 (Fig. 16) secured to the framework or base of the apparatus. It is mounted above a recess 24' (Figs. 13 and 16) of which the purpose will be described hereinafter and it is combined with a counter cutter 41 disposed transversely relatively to the base and adapted to space the two runs of the band. The said cutting device is actuated as in the preceding case, by a push lever 29' with which the cam 20 co-operates.

Another feature of the apparatus resides in the fact that in the base 1 is provided (Fig. 16) an opening divided into two parts 42—42' by a longitudinal rib 43. This rib, as will be seen hereinafter, serves to support the two runs of the superposed band at the point at which the sealing or fastening is effected by the jaws 15—15'.

Two screws 43' are threadedly mounted on the base and serve as abutments for the strap or band. By adjusting these screws bands of different widths may be centered on the rib 43.

Figure 17:
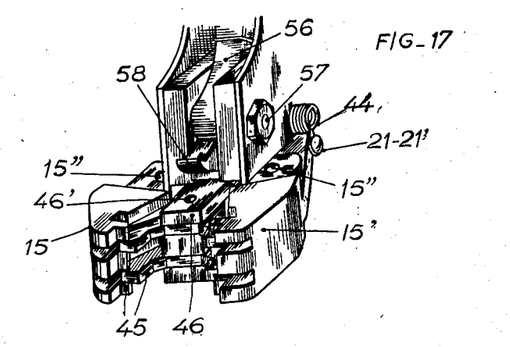
Fig. 17 is a detail view, in perspective of the sealing jaws of the caps or seals.

The device for forming and sealing the seals or caps is also constructed in a manner as to lend itself to the use of bands of different widths. For this purpose, as shown in Fig. 17, the jaws 15, 15' are pivotally mounted at 15" and the ends 21, 21" of their upper branches are connected by a spring 44 passing through the lever 3. This spring normally holds the said jaws in their inoperative position, that is to say, with their lower ends or jaws spaced apart. With these movable jaws 15, 15' cooperate stationary counter jaws 45 mounted in a removable manner by means of a pin 46' or a screw for example on a chair 46.

It will be understood that this mounting of the counter jaws may be used in apparatus or pincers of any type.

When the handle 4 is locked on the lever 3, the lever arm 4, 3 thus formed enables the band to be tensioned. In order to enable this same lever 4, 3 to lower the jaws 15, 15' for forming caps or seals, it is necessary to be able to release the ratchet wheel 7 from its driving pawl 6. For this purpose, the pawl 6 is provided at the rear part with a notch 47 with which co-operates the heel 48 of a stop pawl 49, pivotally mounted at 50 and provided with a boss 51 at the upper part. When tension is being applied to the band, the heel 48 is disengaged from the notch 47 and the pawl 6 is held in engagement with the ratchet wheel 7 by the action of its spring. For releasing the pawl 6 it is sufficient to move the lever 4, 3 rearwardly into the position shown in Fig. 19. By this movement, the pawl 6 strikes against (Fig. 19) the stop pawl 6' and rocks on its axis engaging the heel 48 of the pawl 49 with the notch 47. The device being in this position (Fig. 19) the ratchet wheel 7 is entirely free from the pawl 6.

For effecting the sealing of the cap or seal by the approach of the movable jaws 15, 15' there is used the following device: the handle 4 is provided with a lever 53, pivotally mounted on a shaft 52, having a follower hook 54 and an extension 53' extending behind the locking point of the handle 4, on the lever 3. This lever 53 is subjected to the action of a return spring 55 which bears at the one hand on the handle 4 and on the other hand on the said lever 53 and tends to push the latter downwardly. The compression of the spring 55 may be adjusted by a screw 55' mounted in the lever 4, if desired, as suggested in Fig. 13'. With this lever 53 co-operates a latch 56 pivotally mounted on lever 3 by a shaft 57 and provided, at its lower end, with a hook 58 which can engage with a stop 59 secured to the base. This catch 56 is subjected to the action of a spring 60 which, when the lever 53 is raised, produces the automatic engagement of the hook 58 with the stop 59 as will be described hereinafter.

The approach of the movable jaws 15, 15' is ensured by the action of the cam 20. This cam 20, provided with a heel 20', should therefore occupy the inoperative position during the tensioning of the band and should not become operative until it is desired to obtain the approach of the jaws 15, 15' for effecting the fastening. For this purpose, the shaft 19, to which the cam 20 is keyed, is subjected to the action of a return spring 61 and is provided, on the opposite side to this spring 61, with a stop 62 bearing against the upper branch of the corresponding jaw.

The operation of the apparatus will now be described.

The two runs of the band are inserted laterally into the machine, the counter cutter 41 being interposed between them. For producing the tension the handle 4 is placed in the position shown in Fig. 11, that is the position in which it is held locked by the nipples 36 to the lever 3 and it will be seen that the hook 58 is disengaged from the stop 59 by the push of the lever 53 on which the spring 55 acts. On the other hand, the cam 20 occupies its inoperative position and the driving pawl 6 is in engagement with the wheel 7. The band being located around a package, the crank 12 is turned by means of the handle 13, to lower the milled wheel 8 upon the superposed bands. The lever 4, 3 is pivotally mounted on the shaft of the wheel 8 and is now rocked back and forth and the upper run of the band is fed at each movement of the milled wheel of the pawl 6 while the lower run is held by the striations of a plate 65, adjustable in height, co-operating with the milled wheel. When the tension is sufficient, the driving pawl 6 is released from the ratchet 7, and the band is held tensioned by the pawl 6'.

Figures 19, 20:
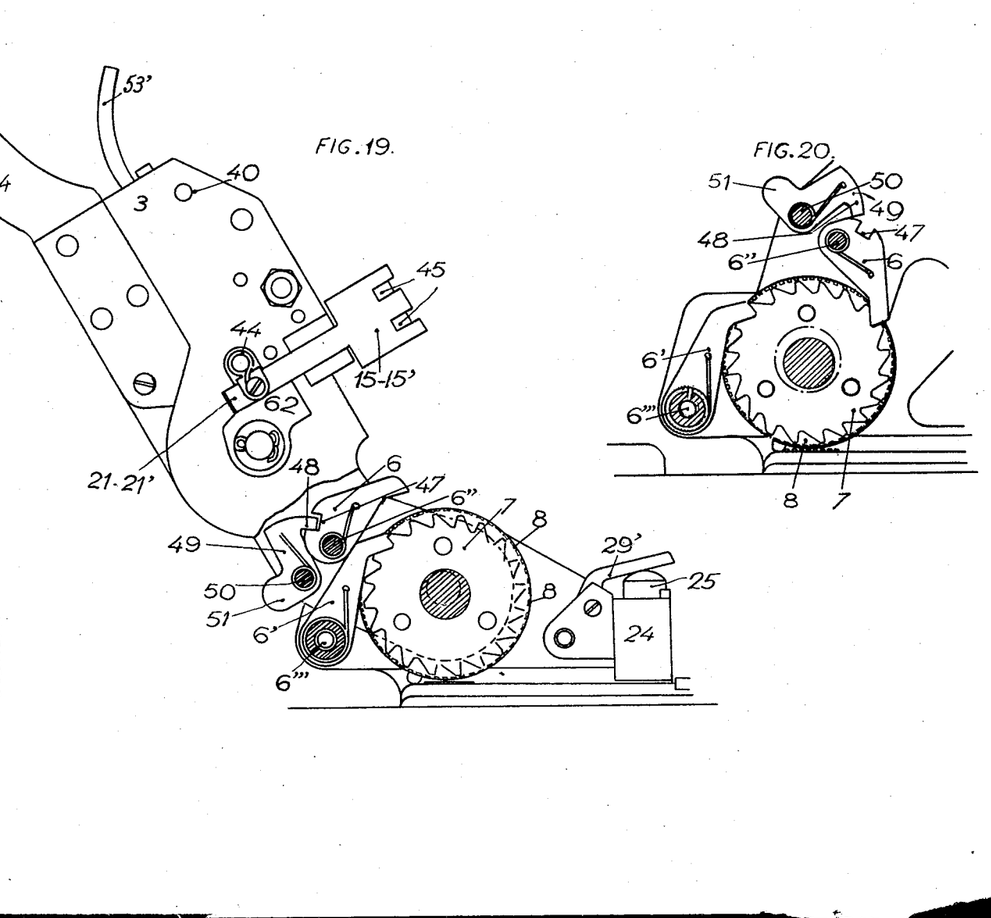
Figure 21:
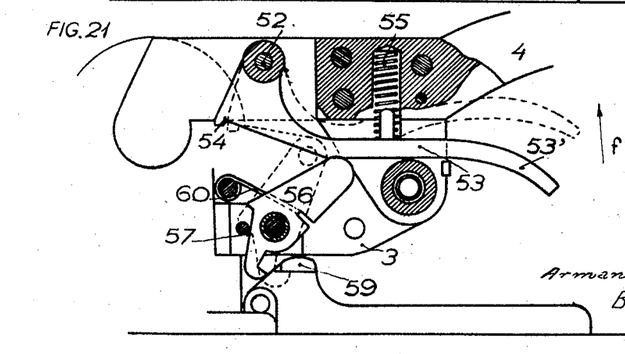
Figure 22:
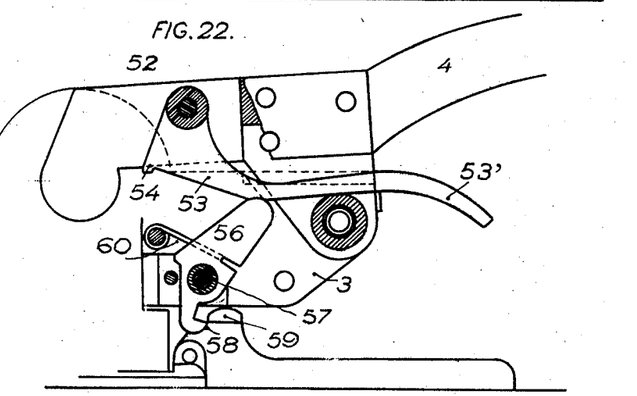
Figure 23:
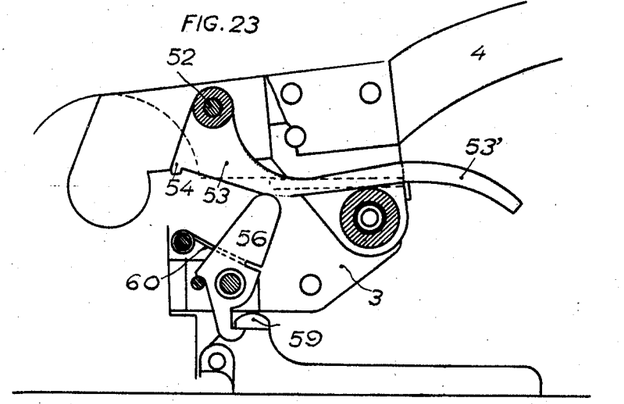

The release of the pawl 6 is effected by moving the lever 3, 4 into its extreme position shown in Fig. 19, which has the effect of bringing the pawl 6 into contact with the pawl 6', which contact throws the pawl 6 into an operative position in which it is locked by the pawl 49.

Figure 11:
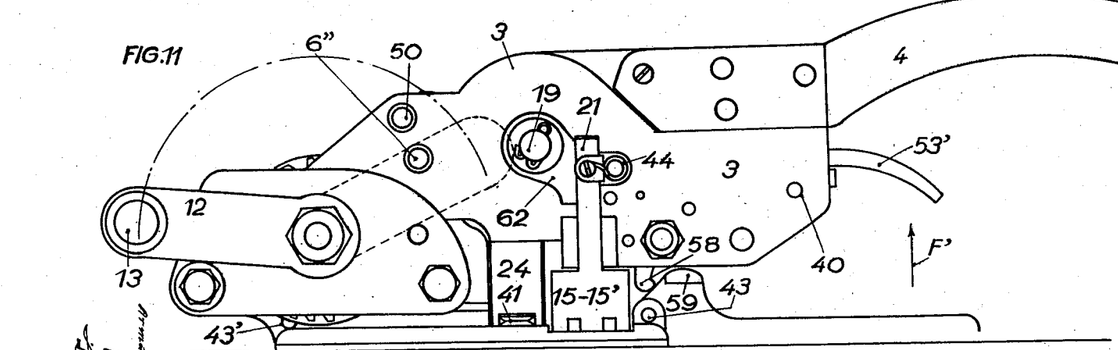
Fig. 11 is a view in side elevation of a modification of the apparatus shown in Fig. 1.
Figure 12:
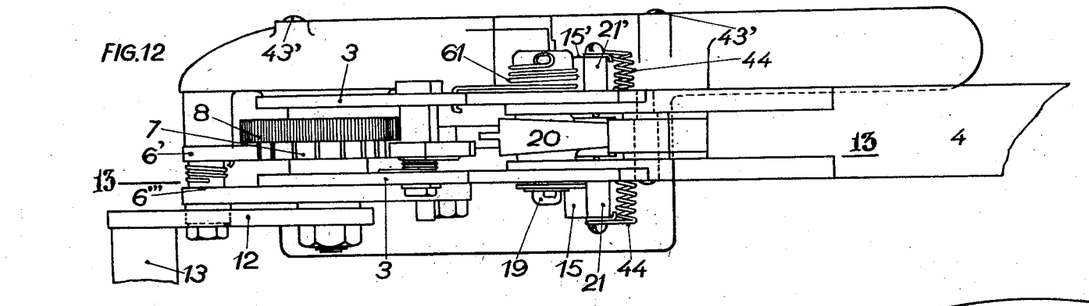
Fig. 12 is a top plan of Fig. 11.
Figure 18:
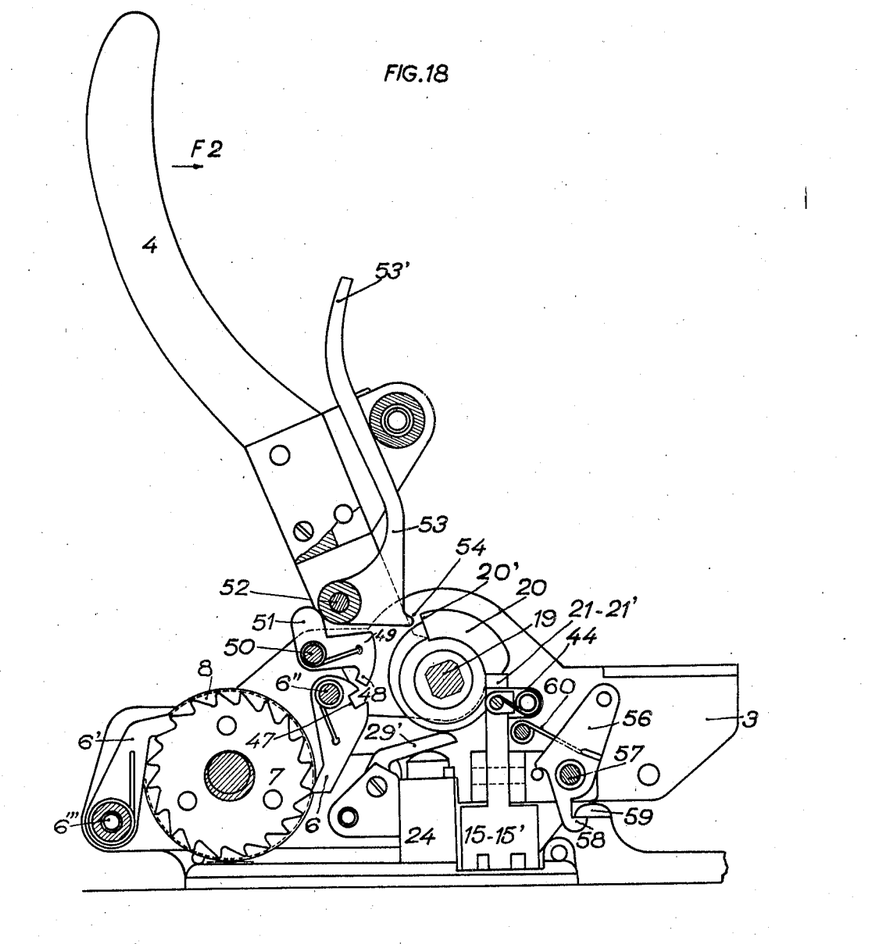
Figs. 18, 19, 20, 21, 22 and 23 are views adapted to explain the operation of the device.

The said lever 4, 3 being in this position a seal or plate is placed between the jaws 15, 15' and the lever 4, 3, is lowered so as to bring it into the position shown in Fig. 11. The said plate which bears against the runs of the band resting on the rib 43, is converted into a seal of suitable shape. For sealing it on the two superposed rims of the band, whilst holding the handle 4 by hand, there is exerted at 53' (Fig. 21) a pressure on the lever 53 in the direction of the arrow f' for releasing the catch 56. This under the action of its return spring 60 engages its hook 58 (Figs. 22 and 23) with the stop 59 thus securing the lever 3 to the base 1 (Fig. 11). In continuing the application of pressure at 53 and at the same time applying a force to the handle 4, the locking nipples 36 are disengaged from their seating 40 and thus enable the handle 4 to be moved into the position shown in Fig. 18, in which the catch 54 engages with the heel 20' of the cam 20. With reference to Fig. 18, it is to be noted that this relative movement between handle 4 and lever 3 brings the boss of the lever 53 into engagement with the pawl 48 and moves it to release the pawl 6, which resumes normal contact with the ratchet 7 preparatory to the next strapping operation. By pressing the lever 4 in the direction of the arrow $f^2$ (Fig. 18) the catch 54, in engagement with the heel 20', moves the cam 20 which then engages between the two ends 21, 21' of the arms of the jaws 15, 15' and causes the lower ends of the jaws to approach, and consequently effects the sealing of the seal or cap. At the moment at which the sealing of the cap commences to be effective on the two superposed runs of the band and centered on the rib 43, the cutting device is actuated through the medium of the push lever 29' which is pressed down progressively by the cam 20. The cutting is effected by the blade 29, which, as above described by reason of the counter cutter 41, cannot in any case shear the lower run of the band. On the other hand, the recess 24' provided in the base below the cutting device enables the cut rim of the band to curve slightly downwards which avoids any roughening on the hooping. It may also be mentioned that by reason of the construction the lower edges of the jaws 15, 15' are located as a result of the provision of the rib 43 in a plane slightly below the plane of the lower band. This arrangement ensures efficient sealing of the seals.

For disengaging the apparatus the crank arm 12 is moved into its rear position shown in broken lines in Fig. 11 in such a manner as to raise the milled wheel 8, pressure is then applied to the lever 53 at 53', in the direction of the arrow F'', the heel 20' of the cam is released by the catch 54 and the cam is moved into its initial inoperative position by the action of the spring 61 mounted on its shaft. The movement of the cam releases the jaws 15, 15' as also the push lever 29' of the cutting device. This movement of the cam is limited by the stop 62 which at the same time regulates the spacing of the jaws.

When no longer pressure is exerted on the lever 53 its spring 55 lowers it and it bears against the upper end of the catch 56, of which the hook 58 leaves the stop 59. At this moment the apparatus can be withdrawn and is ready for a fresh tensioning operation.

In the foregoing description it is assumed that the sealing seal was formed by the jaws 15, 15' from a metal plate. It will be understood that there may be used previously prepared seals, their placing in position on the runs of the band being effected when the handle 4 is in the position of Fig. 18.

In one of the forms of construction above described having a single actuating lever, after the cam 20 has been moved into the operating position between the upper ends of the jaws 15, 15' and has effected the closing or sealing of the cap or seal on the band, it is necessary for disengaging the cap or seal which has been sealed to spread the jaws apart.

For this purpose the said cam must be moved into its initial or inoperative position shown for example in Fig. 18. For this purpose, as above described, the lever 53 is actuated so as to withdraw the hooked catch 54 from the heel 20' of the cam. At this moment the spring 61 returns the said cam rearwardly and the return springs 44 of the jaws automatically produce the spreading apart of the latter.

The apparatus may then effect a fresh tensioning operation of the band.

Figures 24, 25:
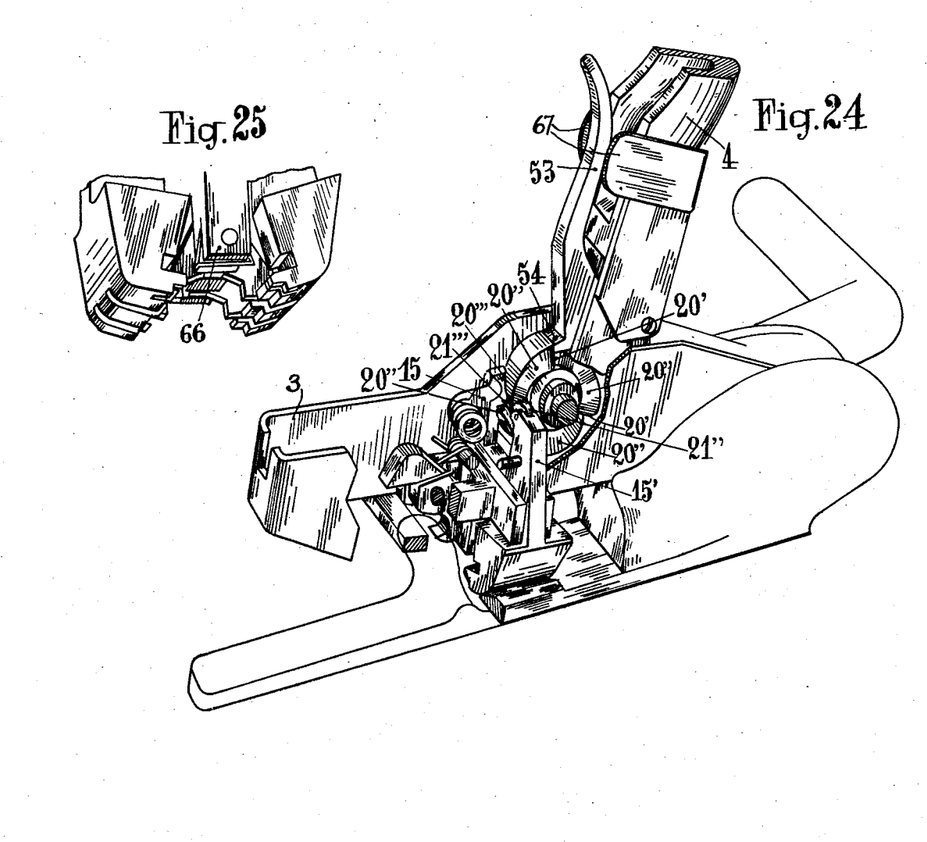
Figs. 24 and 25 show a modification.

In order to obviate the actuation of the lever 53 for returning the cam into its inoperative position as above described, there is provided a special cam device with multiple bosses shown in Fig. 24 of the accompanying drawings. This cam is no longer provided with a return spring 61 as in the preceding case. It is divided into three identical parts or bosses 20'' each having a heel 20' and sides which converge to a narrow portion 20'''.

The catch 54 being engaged with the heel 20' of one of the cams, when the lever 4 is lowered, this cam produces the spreading of the upper arms of the jaws 15, 15' and the sealing of the cap or seal on the band. In any case when the sealing has been completed the upper ends of the arms of the jaws 15, 15' move off the boss of the said cam and, under the action of their spring 44, automatically come into engagement with the adjacent reduced portions 20''' and consequently the jaws proper are spaced apart. After each tensioning of the band and sealing, the succeeding bosses 20'' are used successively, the cam wheel rotating step by step in one direction only. In this embodiment of the invention the lever 4 carries depending spring arms 67 which normally engage the lever 3 and secure the levers 3 and 4 together to operate as a unit.

Another feature of the device shown in Fig. 24 resides in the use instead and in place of friction balls 21, 21' above referred to, of rollers 21'', 21''' turning freely in their shaft in caps formed at the free ends of the arms 15, 15'. These rollers are adapted to prevent wear of the cams 20''.

The device in question is finally characterized by the use, in combination with the specified jaws of a cutter 66, shown in Fig. 25, of the accompanying drawings. During tensioning of the band the lever 3, 4 is not brought down to its lowermost position. When the band is tensioned the lever 3, 4 is brought down to its lowermost position to latch the lever 3 to the base 1. This complete downward movement brings the cutter 66 into firm contact with the upper length of band to cut or mark the same so that it may be severed after sealing by a simple manual bending.

It will be understood that the arrangements above described are not of a limiting character and may receive any desirable constructional modifications without departing from the scope of the invention.

What I claim is:

1. A combined stretching and sealing tool comprising a base, a milled wheel mounted thereon for tensioning the binder, sealing mechanism, a lever comprising two parts pivotally connected together, means securing said parts together so that they may act as a unit for tensioning, means for locking one part to the base, and mechanism operable by relative movement between said parts for effecting the sealing.

2. A combined stretching and sealing tool comprising a base, a milled wheel mounted thereon for tensioning the binder, a lever comprising two parts pivotally connected together, means on one of said parts for actuating said milled wheel, sealing mechanism on said part carrying said actuating means, means for locking said part carrying said actuating means to the base, and means actuated by independent movement of the other part for operating said sealing mechanism.

3. A combined stretching and sealing tool comprising a base, strap tensioning means and a strap cutter mounted on said base, a lever pivotally mounted on said base, means thereon for actuating said tensioning means when the lever is oscillated, sealing mechanism on said lever, a handle pivotally mounted on said lever, and means actuated by movement of said handle relative to the lever for actuating said sealing means and said cutter.

4. A combined stretching and sealing tool comprising a base, strap tensioning means and a strap cutter counted on said base, a lever pivotally mounted on said base, means thereon for actuating said tensioning means when the lever is oscillated, sealing mechanism on said lever, a handle pivotally mounted on said lever, means for locking said handle to said lever, and means actuated by movement of said handle relative to said lever for actuating said sealing means and said cutter.

5. A combined stretching and sealing tool comprising a base, strap tensioning means and a strap cutter mounted on said base, a lever pivotally mounted on said base, means thereon for actuating said tensioning means when the lever is oscillated, sealing mechanism on said lever, means for locking said lever to said base, a handle pivotally mounted on said lever, means for locking said handle to said lever, and means actuated by movement of said handle relative to said lever for actuating said sealing means and said cutter.

6. A stretching tool comprising a base, a milled wheel mounted thereon for tensioning strap, a ratchet wheel rigid with said milled wheel, a pawl on the base preventing rotation of the ratchet in one direction, an oscillatory lever mounted on said base, a second pawl mounted on said lever for rotating said ratchet wheel, a third pawl mounted on said lever adapted to lock the second pawl out of operative position, and an abutment for moving said second pawl into said operative position at one extreme end of the movement of the lever.

7. A stretching tool comprising a base, a milled wheel mounted thereon for tensioning strap, a ratchet wheel rigid with said milled wheel, a pawl on the base preventing rotation of the ratchet in one direction, an oscillatory lever mounted on said base, a second pawl mounted on said lever for rotating said ratchet wheel, a third pawl mounted on said lever adapted to lock the second pawl out of operative position, an abutment for moving said second pawl into said operative position at one extreme end of the movement of the lever, a handle pivotally mounted on said lever for movement relative thereto, and means actuated by said movement for unlocking the driving pawl on the lever.

8. A combined stretching and sealing tool comprising a base, a lever pivotally mounted thereon for oscillation to effect a stretching of the strap, a handle pivotally mounted on said lever, means holding said handle rigidly to said lever, a latch for securing said lever to said base when said handle is moved from said lever, and means on said handle for moving said latch to unlatching position when the handle is returned to normal operative position with respect to the lever.

9. A combined stretching and sealing tool comprising a base, a lever pivotally mounted thereon to effect tensioning of the strap, a handle pivotally mounted on the lever, means securing the handle in rigid relation to the lever during the stretching, sealing means on the lever, and a cam for operating said sealing means, said cam being operated by pivotal movement of the handle upon the lever.

10. In a combined stretching and sealing tool, a pair of sealing jaws for making a seal, a rotary cam for actuating said jaws into sealing relation, means for rotating the cam through predetermined angles stepwise in one direction, the cam including a series of complete configurations for moving the jaws into sealing relation and permitting them to return to initial position, and means for effecting said return of the jaws.

11. A combined stretching and sealing tool comprising a base, a milled wheel mounted thereon for tensioning strap, a pawl on the base preventing rotation of the ratchet in one direction, an oscillatory lever mounted on said base, a second pawl mounted on said lever for rotating said ratchet wheel, a third pawl mounted on said lever adapted to lock the second pawl out of operative position, an abutment for moving said second pawl into said operative position at one extreme end of the movement of the lever, and sealing means actuated by movement of the lever.

12. A combined stretching and sealing tool comprising a base, a milled wheel mounted thereon for tensioning strap, a ratchet wheel rigid with said milled wheel, a pawl on the base preventing rotation of the ratchet in one direction, an oscillatory lever mounted on said base, a second pawl mounted on said lever for rotating said ratchet wheel, a third pawl mounted on said lever adapted to lock the second pawl out of operative position, an abutment for moving said second pawl into said operative position at one extreme end of the movement of the lever, a handle pivotally mounted on said lever for movement relative thereto, means actuated by relative movement of the handle on the lever for unlocking the driving pawl on the lever, and sealing means on the lever actuated by relative movement of the handle with respect to the lever.

ARMAND PERRELET.

CERTIFICATE OF CORRECTION.

Patent No. 2,072,566. March 2, 1937.

ARMAND PERRELET.

It is hereby certified that error appears in the printed specification of the above numbered patent requiring correction as follows: Page 5, first column, line 38, claim 4, for the word "counted" read mounted; and that the said Letters Patent should be read with this correction therein that the same may conform to the record of the case in the Patent Office.

Signed and sealed this 27th day of April, A. D. 1937.

(Seal)

Leslie Frazer
Acting Commissioner of Patents.